United States Patent [19]
Dover

[11] Patent Number: 5,992,834
[45] Date of Patent: Nov. 30, 1999

[54] DEVICE FOR SUPPORTING A SPRING PACK AGAINST COMPRESSION INSTABILITY DISPLACEMENT

[75] Inventor: Harry Dover, Dearborn, Mich.

[73] Assignee: Ford Global Technologies, Inc., Dearborn, Mich.

[21] Appl. No.: 08/113,010

[22] Filed: Aug. 30, 1993

[51] Int. Cl.$^6$ .................................................. F16H 57/10
[52] U.S. Cl. ...................... 267/178; 268/179; 192/89.26; 188/72.3
[58] Field of Search ..................................... 268/182, 178, 268/179, 174, 169, 289, 291; 188/72.3, 73.38; 192/106.2, 76.28, 89 CP, 89 CC, 89.26; 475/159, 331

[56] References Cited

U.S. PATENT DOCUMENTS

| | | | |
|---|---|---|---|
| 1,936,031 | 11/1933 | Ruesenberg | 192/89 CP |
| 2,230,520 | 2/1941 | Wemp | 188/72.3 |
| 2,378,097 | 6/1945 | Piron | 267/291 |
| 3,891,823 | 6/1975 | Dulupe et al. | 267/179 |
| 4,759,234 | 7/1988 | Premiski et al. | |
| 4,830,345 | 5/1989 | Mar | 267/178 |

*Primary Examiner*—Matthew C. Graham
*Attorney, Agent, or Firm*—Frank G. McKenzie

[57] ABSTRACT

A spring support assembly for preventing compression instability displacement of helically coiled compression springs includes first and second support rings located at axially opposite ends of an arrangement of coil springs, the springs located at equal angular intervals about a longitudinal axis. Each support ring includes a support surface against which an end of each spring is supported, outwardly turned flanges located within each spring coil, and a tab extending partially along the length of the spring having close-fitting contact with the inside diameter of the spring coil. A support ring at the opposite end of the spring pack includes a support surface and tab angularly offset from the support surface, the tabs of each support ring located in adjacent compression springs.

12 Claims, 2 Drawing Sheets

DEVICE FOR SUPPORTING A SPRING PACK AGAINST COMPRESSION INSTABILITY DISPLACEMENT

BACKGROUND OF THE INVENTION

1. Field of the Invention

This invention pertains to hydraulically actuated clutches and brakes of an automatic transmission. More particularly the invention pertains to compression spring assemblies that return a hydraulic piston to its disengaged position.

2. Prior Art

An hydraulically actuated clutch or brake used in automatic transmissions to hold and release elements of a planetary gearset in order to produce the various gear ratios of the transmission, includes an hydraulic cylinder, a piston mounted for movement within the hydraulic cylinder into contact with two sets of clutch friction discs, a pressure plate that reacts force applied by the piston to the friction discs, and a spring assembly that produces a force tending to move the piston away from the friction discs and toward an opposite end of the cylinder—to the disengaged position.

The spring assembly includes a large number of compression springs angularly spaced about the longidutinal axis of the transmission and clutch. One end of each spring is held against a fixed spring retainer against which the spring force is applied, and a retainer located at the opposite end of the compression springs, the retainer bearing against an adjacent surface of an hydraulic piston. A conventional assembly of this type has the hydraulic cylinder formed with studs, angularly spaced about the longitudinal axis and sized to receive a compression spring on each stud. The stud is provided to locate the compression springs correctly within the transmission assembly and to support the spring so that when compression force is developed between the piston and retainer, the spring stays in a stable configuration with its coils aligned mutually and with the axis of the stud. The stud prevents transverse displacement of the coils of the compression springs.

FIG. 1 of U.S. Pat. No. 4,759,234 illustrates a configuration of the spring pack supported with a stud integrally formed with an hydraulic piston.

It is important in the design of automatic transmissions that its lateral dimensions be minimized in order to fit within the relatively small space provided for the transmission in a front-wheel drive vehicle. This objective is realized by reducing as much as possible the radial extent from the longitudinal axis of the transmission of each component for maintaining the distance of the components.

In the design of hydraulically actuated friction clutches and brakes, multiple compression springs (usually about 36 springs) are used to return the piston to its disengaged position within the hydraulic clutch. In order to accommodate the space requirements of the transmission, it is preferable that the return springs have a relatively high slenderness ratio, i.e., that the length of the springs be relatively large in comparison to the diameter. However, it is well-known that a compression spring having a high slenderness ratio is susceptible to compression instability displacement, a condition in which the spring distorts from a linear line of travel such that the intermediate portion of the spring is displaced angularly with respect to the coils of the spring located near the ends of the springs.

In clutch assemblies of the type used in automatic transmission clutches and brakes, a large number of compression springs is used in a single assembly to return a piston to its disengaged position. When compression instability occurs in such an assembly of springs, the entire spring pack rotates angularly at one end with respect to the position at the opposite axial end of the spring pack.

The effect of compression instability deformation is to produce a variable spring constant, i.e., the relationship of the spring force to its displacement from the unloaded or free length of the spring.

Instability deformation of the compression spring pack produces a variable rate of clutch engagement because the return spring offers a variable and unpredictable force in opposition to the hydraulic pressure force developed on the piston that causes engagement of the hydraulic clutch and brake.

Instability deformation of the compression return springs also causes excessive clutch wear because the friction plates of the clutch are not fully engaged when the clutch is actuated hydraulically because of excessive resistance opposing that action produced by the clutch pack.

SUMMARY OF THE INVENTION

To avoid these difficulties and other shortcomings of prior art techniques for stabilizing compression springs against instability, a clutch support and spring assembly according to the present invention includes a first support ring disposed substantially symmetrically about the longitudinal axis, planar surfaces mutually spaced angularly about the axis, and a first set of tabs directed perpendicular to the support surfaces and mutually spaced angularly about the axis, each of the first tabs located between consecutive first support surfaces.

A second support ring, similar to the first ring, is located at the opposite axial end of an annular arrangement of helical coiled compression springs. The second support ring includes second support surfaces located in a plane spaced longitudinally from the first support surface plane, each of the second support surfaces spaced angularly about the axis and aligned angularly with a tab of the first support ring. The second support ring includes a second set of tabs extending perpendicular to the plane of the second support surfaces and toward the first support ring, each of the second tabs being mutually spaced angularly about the axis, located between adjacent second support surfaces and aligned angularly with a first support surface of the first support ring.

In this way, the first and second support rings provide support surfaces at each end of the angularly spaced annular arrangement of compression springs, a tab of the first support ring extends within alternate compression springs from one axial end of the assembly, and a tab formed integrally with the second support ring extends within alternate compression springs from the axially opposite end of the assembly. Each compression spring, therefore, is supported by one tab formed either on the first or the second support ring.

Each of the support surfaces is formed with circular flanges sized to fit within the inside diameter of the compression springs. The tabs of each support ring are in close-fitting contact with the inside diameter of the compression spring. The assembly of springs and support rings is held in place due to the close contact between the tabs and the compression spring, thereby permitting the assembly to be held together and transported easily.

DESCRIPTION OF THE PREFERRED EMBODIMENT

Figure 1:
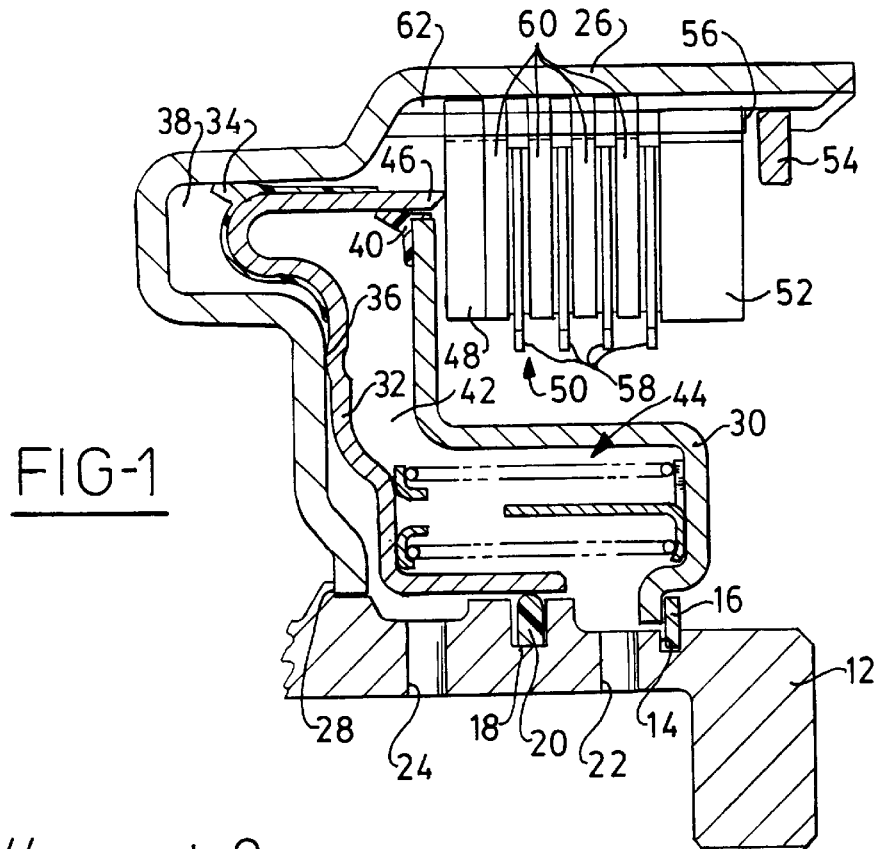
FIG. 1 is a cross-section of a portion of an automatic transmission taken in the vicinity of an hydraulically actuated friction clutch and showing the associated components.

FIG. 1 shows a balanced piston assembly of the type used in an hydraulically actuated clutch used in an automatic transmission for a motor vehicle. The components are arranged symmetrically about the longitudinal axis 10 of the transmission. However, in FIG. 1 only those components above that axis are shown. A cylinder and hub assembly 12, extending substantially parallel to axis 10, includes a recess 14 into which a retaining ring 16 is fitted; a recess 18, which holds hydraulic seal 20; and ports 22, 24, through which pressurized hydraulic fluid is supplied to the interior of hydraulic cylinder 26, which is fixed to the hub assembly 12 at an attachment 28.

Clutch return piston assembly 30 is held in position on the hub assembly 12 by the retaining ring 16. The clutch piston assembly 32, supported within cylinder 26 for movement parallel to axis 10, carries a seal 34, which contacts the inner surface of the cylinder and is held in sliding contact with seal 20. Piston 32 is formed with a localized bead 36, which contacts the inner surface of cylinder 26 to limit leftward movement of the piston and to permit hydraulic fluid to enter and fill the portion 38 of the cylinder located to the left of the piston. The clutch return piston 30 carries an hydraulic seal 40 at its radially outer end for sealing the space 42 located between pistons 30 and 32. Piston 30 is formed with a pocket or well, within which is located a clutch support and spring assembly 44.

Spaces 38 and 42 within cylinder 66 are connected, respectively, through hydraulic passages 24 and 22 to a source of pressurized hydraulic fluid. When the clutch assembly rotates about axis 10, centrifugal force develops a pressure head within the cylinder, but that pressure develops static force of substantially equal magnitude on opposite sides of piston 32, thereby balancing the effect of centrifugal force.

When the pressure of hydraulic fluid in passage 24 and space 38 of hydraulic cylinder 26 is elevated with respect to the magnitude of the pressure in passage 22 and space 42, piston 32 is moved rightward against the effect of the spring assembly 44, forcing the end 46 of the piston into contact with a wave spring 48. This forces plates of the clutch plate assembly 50 into mutual frictional contact and into contact also with a pressure plate 52, which is fixed against displacement by a snap ring 54 fitted in a recess 56 formed on the inner surface of cylinder 26. The clutch plate assembly includes discs 58 connected by a radially inner spline to a component of the transmission, and a second set of discs 60 connected by a radially outer spline 62 to the inner surface of piston 26. When pressure is reduced within passage 24 and space 38 of the clutch cylinder, compression springs of the spring assembly 44 force piston 32 leftward until bead 36 contacts the inner surface of the hydraulic cylinder.

Figure 7:
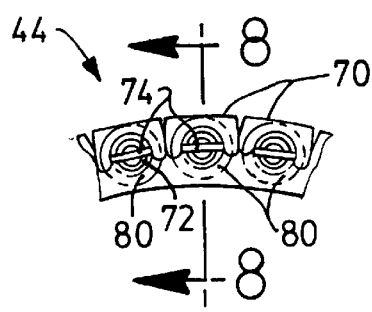
FIG. 7 is an end view of a support and spring assembly according to this invention.
Figure 8:
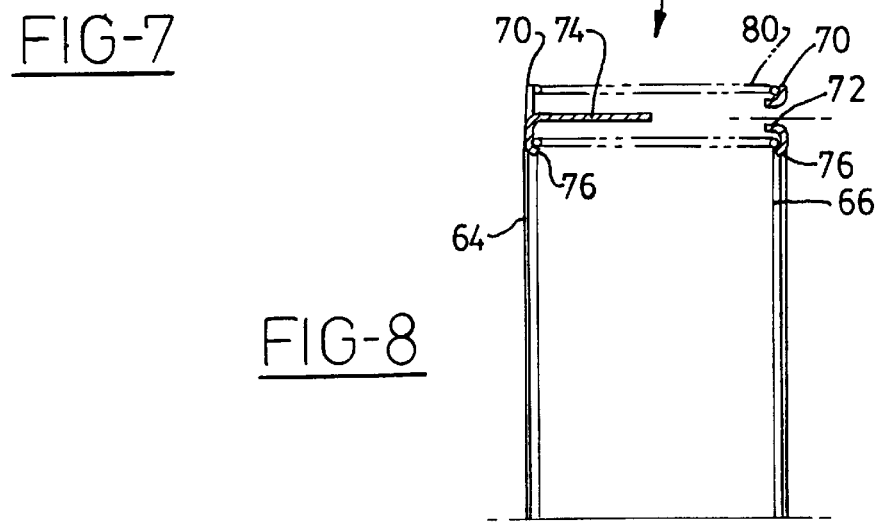
FIG. 8 is a cross-section taken at plane 8—8 of FIG. 7.
Figures 2, 3:
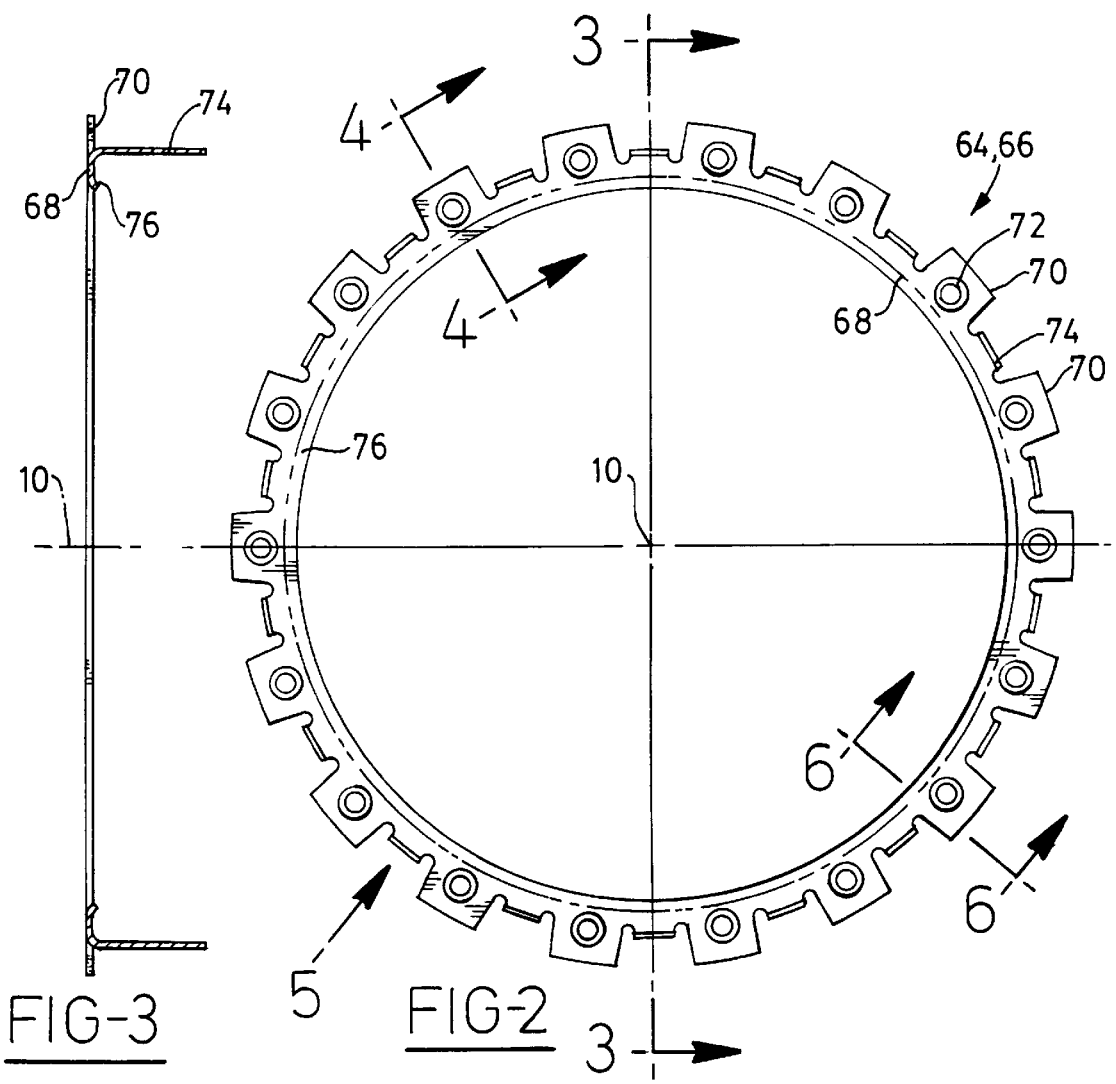
FIG. 2 is an end view of a clutch return spring support.
FIG. 3 is a cross-section taken at plane 3—3 of FIG. 2.
Figure 4:
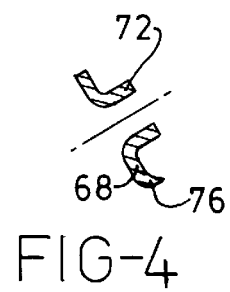
FIG. 4 is a cross-section taken at plane 4—4 of FIG. 2.
Figure 5:
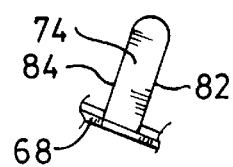
FIG. 5 is a view of a tab of the support of FIG. 2.
Figure 6:
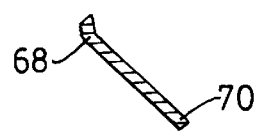
FIG. 6 is a cross-section taken at plane 6—6 of FIG. 2.

Referring now to FIGS. 7 and 8, spring assembly 44 includes first and second spring support rings 64, 66, respectively. A typical spring support ring, shown in detail in FIGS. 2–6, includes a circular ring 64, 66 disposed symmetrically about longitudinal axis 10 and containing multiple support surfaces 70, which extend substantially in a radial plane. Each support surface is formed also with flanges 72, which extend substantially perpendicular to the plane of the support surface. FIG. 2 shows an arrangement containing 36 support surfaces distributed at equal angular intervals about axis 10, each surface being spaced angularly with respect to adjacent support surfaces. Interposed between each support surface are tabs 74 formed integrally with the ring and directed substantially perpendicular to the plane of the ring and parallel to axis 10.

The radially inner end of support surfaces 70 is formed with a tang 76 turned longitudinally from the plane of the support surface. The outer diameter of the circular flanges 72 is sized to fit within the inside diameter of a helically coiled compression spring 80. Tang 76 is sized and located to receive the outer surface of a compression spring, thereby providing support for an axial end of the spring. Edges 82, 84 of each tab 74 extend parallel to axes 10 and are spaced mutually so that the tab's width fits within the inside diameter of a compression spring (as seen best in FIG. 7) closely fitting the inner surface of the corresponding spring.

Referring again to FIGS. 7 and 8, each spring support assembly includes two spring support rings 64, 66. Support surfaces 70 provide a radial surface against which the end of a coiled compression spring 80 is held in contact. The tabs 74 of ring 64 extend rightward partially along the length of angularly alternate springs; the tabs of ring 66 extend leftward partially along the length of the radially alternate spring, other than the springs in which the tabs of ring 66 are located. The opposite end of each spring is fitted over the flanges 72 formed on the support surfaces of the support rings 66, 68. The tabs 74 extend substantially midway through the inactive or free-condition length of each spring. The close fitting contact between the lateral edges of the tabs and the coil springs operate to hold the springs and support rings together as an assembly for easy movement.

Support surface 70 of the spring support ring 66 is angularly offset from the support surface of support ring 64 approximately 10°, i.e., the angular pitch between each of the 36 coiled compression springs included in the spring assembly.

The closely-spaced angular relationship of the adjacent coil springs, the close-fitting contact between the tabs and the inner diameter of the coil springs, and the fit of the tabs from axially opposite ends of adjacent coil springs support the springs against compression instability displacement. The springs assembled and supported according to this invention produce a substantially uniform spring constant, the relationship of the compression force produced by the spring and the displacement of the spring from its free, unloaded length.

This assembly and means for supporting the spring pack permits use of compression springs having a relatively high slenderness ratio, i.e., springs that are long in relation to the diameter of the coil.

I claim:

1. A device for supporting and containing a assembly of components, comprising:
    a first support ring substantially symmetric about a longitudinal axis, having
        first surfaces disposed in a first plane and mutually spaced angularly about the axis, first tabs extending substantially perpendicular to the first surfaces, mutually spaced angularly about the axis, each first tab angularly located between adjacent first surfaces;

a second support ring substantially symmetric about said longitudinal axis, having
second surfaces disposed in a second plane that is spaced longitudinally from the first plane, mutually spaced angularly about the axis, each second surface substantially aligned angularly with a first tab,
second tabs extending substantially perpendicular to the second surfaces and toward the first surfaces, mutually spaced angularly about the axis, each second tab angularly located between adjacent second surfaces and substantially aligned angularly with a first surface;
each said first tab extending toward the second surface and each said second tab extending toward the first surface.

2. The device of claim 1 wherein the first tabs have length extending toward the second support ring and width directed angularly about the axis, and the second tabs have length extending toward the first support ring and width directed angularly about the axis.

3. The device of claim 1 wherein the first surfaces have flanges extending substantially perpendicular to the first plane and toward the second support ring, the second surfaces have flanges extending substantially perpendicular to the second plane and toward the first support ring.

4. The device of claim 1 wherein the first and second support rings are of sheet metal.

5. A device for containing and supporting a spring assembly, comprising:
a first support ring substantially symmetric about a longitudinal axis, having
first surfaces disposed in a first plane and mutually spaced angularly about the axis,
first tabs extending substantially perpendicular to the first surfaces, mutually spaced angularly about the axis, each first tab angularly located between adjacent first surfaces;
a second support ring substantially symmetric about said longitudinal axis, having
second surfaces disposed in a second plane that is spaced longitudinally from the first plane, mutually spaced angularly about the axis, each second surface substantially aligned angularly with a first tab,
second tabs extending substantially perpendicular to the second surfaces and toward the first surfaces, mutually spaced angularly about the axis, each second tab angularly located between adjacent second surfaces and substantially aligned angularly with a first surface;
each said first tab extending toward the second surface and each said second tab extending toward the first surface; and
coiled springs extending along and angularly spaced mutually about said axis, arranged in first and second groups of alternate springs, each spring of the first group having a first end adjacent a first surface and a second end overlapping a second tab, each second tab located within and extending along the coil of said spring, each spring of the second group having a second end adjacent a second surface and a first end overlapping a first tab, each first tab located within and extending along the coil of said spring.

6. The device of claim 5 wherein each first surface has a flange extending substantially perpendicular to the first plane and toward the second support ring, each second surface has a flange extending substantially perpendicular to the second plane and toward the first support ring, the first end of each spring of the first group overlapping the flange of a first surface, the second end of each spring of the second group overlapping the flange of a second surface.

7. The device of claim 5 wherein each first tab has length extending toward the second support ring and width directed angularly about the axis between coiled surfaces of the spring in which said tab is located, and the second tabs have length extending toward the first support ring and width directed angularly about the axis between coiled surfaces of the spring in which said tab is located.

8. An assembly for supporting springs against deformation, comprising:
a first support ring substantially symmetric about a longitudinal axis, having
first surfaces disposed in a first plane and mutually spaced angularly about the axis,
first tabs extending substantially perpendicular to the first surfaces, mutually spaced angularly about the axis, each first tab angularly located between adjacent first surfaces;
a second support ring substantially symmetric about said longitudinal axis, having
second surfaces disposed in a second plane that is spaced longitudinally from the first plane, mutually spaced angularly about the axis, each second surface substantially aligned angularly with a first tab,
second tabs extending substantially perpendicular to the second surfaces and toward the first surfaces, mutually spaced angularly about the axis, each second tab angularly located between adjacent second surfaces and substantially aligned angularly with a first surface;
each said first tab extending toward the second surface and each said second tab extending toward the first surface; and
coiled springs extending along and angularly spaced mutually about said axis, arranged in first and second groups of alternate springs, each spring of the first group having a first end adjacent a first surface and a second end overlapping a second tab, each second tab located within and extending along the coil of said spring, each spring of the second group having a second end adjacent a second surface and a first end overlapping a first tab, each first tab located within and extending along the coil of said spring; and
a cylinder containing the first support ring, second support ring and springs;
a piston located within the cylinder for displacement therein, located for contact with one of the first support ring and the second support ring.

9. The device of claim 8 wherein each first tab has length extending toward the second support ring and width directed angularly about the axis between coiled surfaces of the spring in which said tab is located, and the second tabs have length extending toward the first support ring and width directed angularly about the axis between coiled surfaces of the spring in which said tab is located.

10. The device of claim 8 wherein the cylinder is adapted for connection at a first side of the piston to a source of pressurized hydraulic fluid and the first and second support rings are located on a side of the piston opposite the side of said connection.

11. The device of claim 9 wherein each first surface has a flange extending substantially perpendicular to the first plane and toward the second support ring, each second surface has a flange extending substantially perpendicular to the second plane and toward the first support ring, the first end of each spring of the first group overlapping the flange of a first surface, the second end of each spring of the second group overlapping the flange of a second surface.

12. An assembly for supporting springs against deformation, comprising:

a first support ring substantially symmetric about a longitudinal axis, having first surfaces disposed in a first plane and mutually spaced angularly about the axis, a second support ring substantially symmetric about said longitudinal axis, having second surfaces disposed in a second plane that is spaced longitudinally from the first plane, mutually spaced angularly about the axis, each second surface substantially aligned angularly with a first surface, first tabs extending substantially perpendicular to the second surfaces and toward the first surfaces, mutually spaced angularly about the axis, each first tab extending from a second surface and substantially aligned angularly with a first surface; and coiled springs extending along and angularly spaced mutually about said axis, each spring having a first end adjacent a first surface and a second end overlapping a first tab located within and extending along the coil of said spring;

a cylinder containing the first support ring, second support ring and springs;

a piston located within the cylinder for displacement therein, located for contact with one of the first support ring and the second support ring.

\* \* \* \* \*